United States Patent
Schmitt

(12) 
(10) Patent No.: US 6,347,459 B1
(45) Date of Patent: Feb. 19, 2002

(54) TEMPLATE SYSTEM FOR MARKING BRICKS

(76) Inventor: Mark R. Schmitt, 26 W. 109 Embden La., Wheaton, IL (US) 60187

( * ) Notice: Subject to any disclaimer, the term of this patent is extended or adjusted under 35 U.S.C. 154(b) by 0 days.

(21) Appl. No.: 09/499,436

(22) Filed: Feb. 7, 2000

(51) Int. Cl.[7] .............................. G01B 5/20; G01B 3/14
(52) U.S. Cl. ......................... 33/561.2; 33/518; 33/526
(58) Field of Search ............................ 33/561.2, 518, 33/526, 527, 561.1, 561.3, 562

(56) References Cited

U.S. PATENT DOCUMENTS

| | | | | |
|---|---|---|---|---|
| 1,136,295 A | * | 4/1915 | Szilard | 33/561.2 |
| 1,233,382 A | * | 7/1917 | Malsin | 33/561.2 |
| 1,367,924 A | * | 2/1921 | Sibley | 33/561.3 |
| 2,155,169 A | * | 4/1939 | Moses | 33/561.2 |
| 2,798,299 A | * | 7/1957 | Cooper | 33/561.2 |
| 2,813,710 A | * | 11/1957 | Angle | 33/561.2 |
| 2,923,066 A | * | 2/1960 | Jones, Jr. | 33/561.2 |
| D313,280 S | | 12/1990 | Rodenburgh et al. | |
| 5,208,992 A | * | 5/1993 | Syken | 33/465 |
| 5,537,805 A | * | 7/1996 | Allman | 33/518 |

OTHER PUBLICATIONS

"A Road To The Future: Tracing The History Of Concrete Pavers" by David R. Smith, Sep. 1999.
"Unlock® Installation Tech Guide", ©copyright Unilock 1999.
Anchor Sahara Stone® "You Can't Beat The Anchor Do–it–Yourself System", ©1997 Anchor Wall Systems Inc., "Anchor Windsor Stone Pinless System®".

Anchor Sahara Stone® "You Can't Beat The Anchor Do–It–Yourself System", ©1997 Anchor Wall Systems, Inc., "Anchor Pinless System®".

* cited by examiner

Primary Examiner—Christopher W. Fulton
(74) Attorney, Agent, or Firm—Trexler, Bushnell, Giangiorgi, Blackstone & Marr, Ltd.

(57) ABSTRACT

A template system enables an installer to mark a plurality of bricks laid in a pattern to define a desired edge shape of the bricks. The template system includes a flexible tool which provides a surface against which a marking tool can be placed, and a plurality of anchors. Each anchor is attached to at least one brick and is removable therefrom. In use, the anchors are attached to the bricks. The tool is then attached to the anchors such that the desired shape is provided. Thereafter, the marking tool is run along the length of the tool to mark the desired shape onto the bricks. The tool and anchors are removed and the bricks are then cut by suitable means so that the desired border or edge shape is formed.

20 Claims, 5 Drawing Sheets

TEMPLATE SYSTEM FOR MARKING BRICKS

BACKGROUND OF THE INVENTION

The present invention is directed to a novel template system which includes a tool which is mounted on a brick walkway, driveway or the like and which provides a template for an installer to quickly and easily mark the bricks so that the bricks can thereafter be cut to form a precise, predetermined edge shape.

Prior to twenty-five to thirty years ago, bricks were made out of clay. Each clay brick was produced to be a specific size. Because of the varying amounts of moisture content in each brick, when baked, the bricks came out of the process in different sizes. When the bricks were installed by laying them side by side, to create consistency, a gap was left between the bricks. When a brick was bigger, the gap became smaller, and when the brick was smaller, the gap became larger. This gapping of the bricks created some problems after the bricks were installed. Because of the differing sizes, the surface was slightly uneven. In areas where there is snow, shoveling this uneven surface was difficult. The gaps allowed for organic material to collect and weeds, grass and the like grew in the gaps.

In the last twenty-five to thirty years, the brick paving industry has been manufacturing bricks out of concrete to address the problems that occur with clay bricks. Concrete bricks are formed very consistently with each other. As a result, a more exacting and consistent installation process resulted. The gap became a consistent 1/16 of an inch which left little room for error.

The installation process became more precise to be consistent with the more precise concrete bricks as the concrete bricks can be laid tightly against each other to form a pattern. The gaps and inconsistencies in the installation process were minimized, but there have been inconsistencies in the modification or cutting of the concrete bricks along the border of the pattern. If the cuts are uneven, the unevenness shows along the border.

Installer have used many different methods in an attempt to provide a better cut brick. The brick laying process involves laying bricks larger than the designated paving area. The installer would then cut the desired shape out of the paving surface.

To form a straight edge shape, installers have measured the brick, drew a line on the brick using a straight edge, such as a piece of wood or steel, and thereafter cut the brick. To form a curved edge shape, a flexible but rigid guide has been used. Strips of plastic, a water hose, and brick paver edging have been some of the makeshift forms that installers have used to mark the paving bricks. The guide is laid on the brick or ricks, the line is drawn, and the brick(s) are cut.

Many of these methods require more than one person. Preferably, two people are used to hold the tool and a third person marks the bricks. This can take a significant amount of time. Many of these methods also have to be done more than once to achieve a better end shape because most of the time the lines are not completely curved or straight. Usually, there is an imperfection that needs to be changed.

Moreover, in order for an excellent end shape to be obtained by using a "homemade" tool, the installer must be experienced. Cutting bricks in these shapes requires a significant amount of minor adjusting. An inexperienced installer has a learning curve when trying to mark and cut the bricks and these "homemade" tools are not designed for repeated use. As such, these "homemade" tools can be easily damaged.

The present invention provides a template which allows an installer to properly mark the bricks—in an easy and quick manner—so that the bricks can then be cut in a precise manner, but with a greatly reduced amount of time and a reduced amount of effort versus prior art methods. The template of the present invention can be quickly and easily positioned on the bricks, even by an inexperienced user, so that the installer can mark the bricks for cutting. The template of the present invention is intended to be used repeatedly. Other features and advantages will become apparent upon a reading of the attached specification in combination with a study of the drawings.

OBJECTS AND SUMMARY OF THE INVENTION

It is a general object of the present invention to provide a novel template system which enables an installer to mark a plurality of bricks which have been laid in a pattern such that a desired shape is marked on the bricks.

It is an object of the present invention to provide a novel template system which can be used by an installer to form a multitude of shapes with a smooth edge always resulting.

It is a further object of the present invention to provide a novel template system which is easy to use and can be used with little instruction.

It is an even further object of the present invention to provide a novel template system which can be used and re-used many times.

Briefly, and in accordance with the foregoing, the present invention provides a novel template system which enables an installer to mark a plurality of bricks laid in a pattern to define a desired edge shape of the bricks. The template system includes a flexible tool which provides a surface against which a marking tool, such as a scribing tool, can be placed, and a plurality of anchors. Each anchor is attached to at least one brick and is removable therefrom. In use, the anchors are attached to the bricks. The tool is then attached to the anchors such that the desired edge shape is provided. Thereafter, the marking tool is run along the length of the tool to mark, such as by scribing, the desired shape onto the bricks. The tool and anchors are removed and the bricks are then cut by suitable means so that the desired edge shape is formed.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
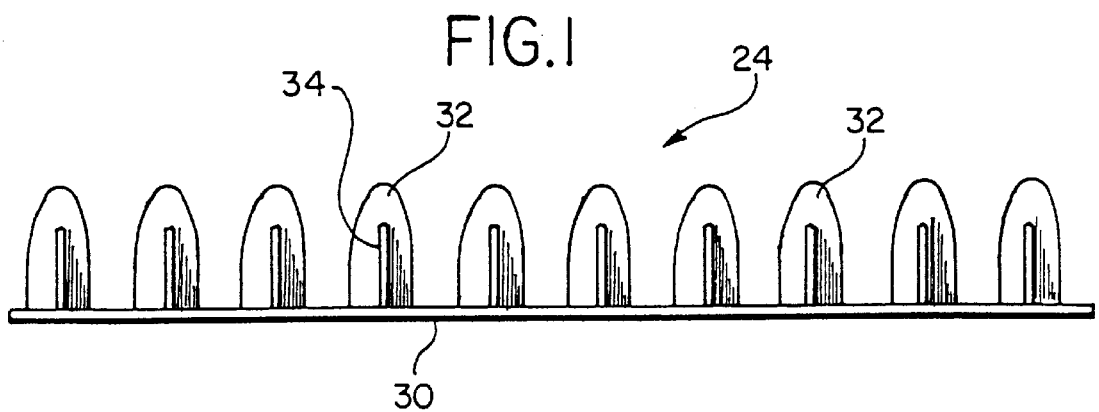
FIG. 1 is a top plan view of a section of a first embodiment of a tool which forms a portion of the template system of the present invention.
Figure 2:
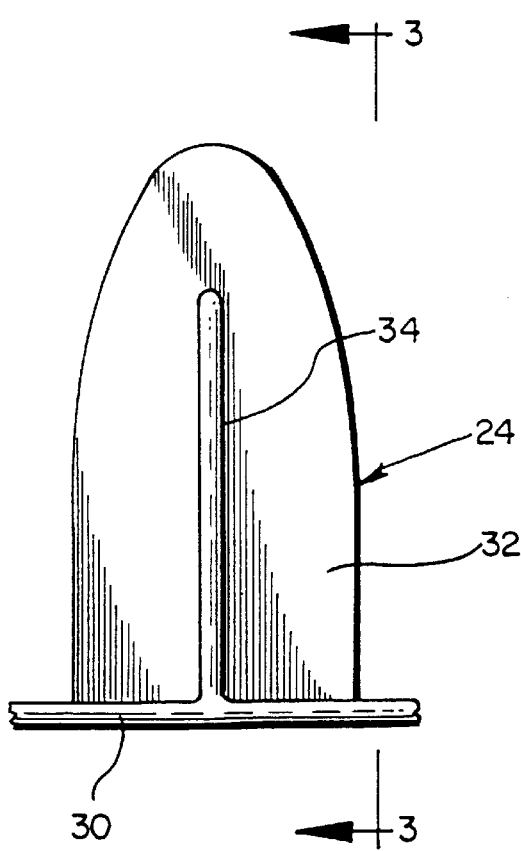
FIG. 2 is an enlarged top plan view of a middle portion of the tool of FIG. 1.
Figure 3:
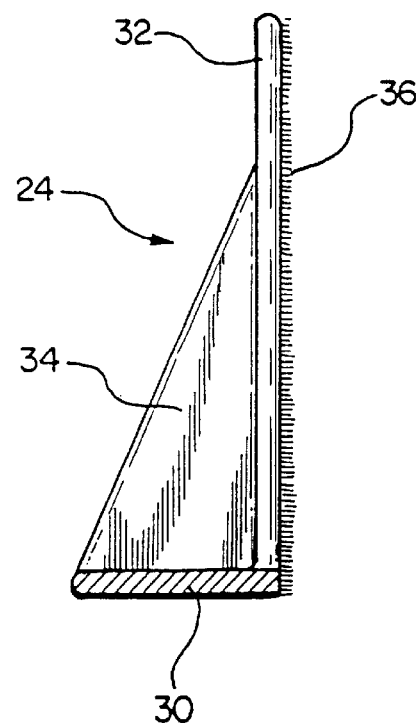
FIG. 3 is a cross-sectional view along line 3—3 of FIG. 2.
Figure 4:
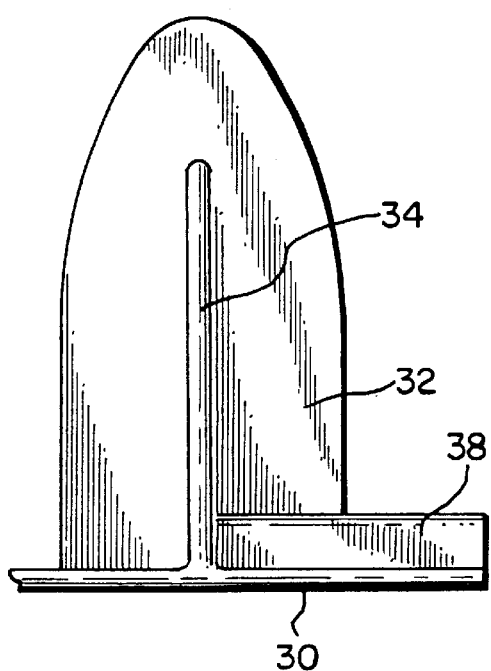
FIG. 4 is an enlarged top plan view of an end portion of the tool of FIG. 1.
Figure 5:
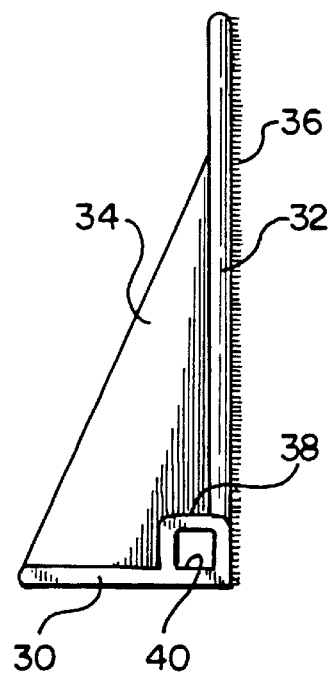
FIG. 5 is an end elevational view of the tool of FIG. 1.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel template system 20 which enables an installer to mark a plurality of bricks 22, such as by scribing, which have been laid in a pattern such that a desired shape is marked on the bricks 22. The bricks 22 are then cut along the shape by suitable brick cutting means to provide a smooth border or edge along the bricks 22. The system 20 of the present invention is easy to use, can be used with little instruction, can be used and re-used many times, and can be used to form a multitude of edge shapes with a smooth edge always resulting.

The template system 20, 20a includes a flexible tool 24, 24a and a plurality of anchors 26, 26a. The anchors 26, 26a are mounted onto the bricks 22 and, thereafter, the tool 24, 24a is mounted onto the anchors 26, 26a. The tool 24, 24a provides a surface 28, 28a along which a marking tool (not shown), such as a scribing tool, can be placed such that the marking tool can mark, such as by scribing, the bricks 22 by running the marking tool along the length of the tool 24, 24a. The tool 24, 24a can be formed into a variety of shapes so that a multitude of curved border or edge shapes can be formed on the bricks 22. The template system 20, 20a of the present invention can be used to define a straight edge into the pattern of bricks 22.

A first embodiment of the template system 20 is shown in FIGS. 1–8 and 14 and includes tool 24, anchors 26 and a connecting member 25. This first embodiment of the template system 20 is especially suited for use in forming tight curves. The template system 20 can also be used to form straight lines. A second embodiment of the template system 20a is shown in FIGS. 9–14 and includes tool 24a, anchors 26a and connecting member 25. This second embodiment of the template system 20a is better suited for use in forming shallow curves and straight lines. The anchors 26a shown in FIGS. 11 and 12 can be used with the tool 24 of FIGS. 1–5, and the anchors 26 shown in FIGS. 6 and 7 can be used with the tool 24a shown in FIGS. 9 and 10.

Attention is now invited to the first embodiment of the template system 20 shown in FIGS. 1–8 and 14.

The tool 24 includes a base rail 30, a plurality of teeth 32 attached to the base rail 30, and a plurality of support ribs 34. A support rib 34 is provided between each tooth 32 and the base rail 30. The base rail 30, the teeth 32 and the support ribs 34 are preferably integrally formed with each other and are formed of a suitable material, such as flexible, but rigid, plastic.

The base rail 30 is elongated and forms the surface 28 against which the marking tool is placed. The base rail 30 is flexible such that the base rail 30 can be moved into a variety of shapes. The base rail 30 preferably has a thickness of one-eighth of an inch and a height of one and one-half inches. The length of the base rail 30 can vary depending on the application, but is preferably eight feet long.

The teeth 32 are attached to the base rail 30 and are spaced apart from each other along the length of the base rail 30. Each tooth 32 is perpendicular to the base rail 30. Each tooth 32 has a first section which has straight edges and which is adjacent to the base rail 30, a second section which has radiused edges and a third section at the end of each tooth 32 which defines a curved edge and which connects the radiused edges of the section together. The length of the first section is preferably two inches with the second and third sections decreasing in length to the end of each tooth 32; the width of each tooth 32 is preferably four inches; and the thickness of each tooth 32 is preferably one-eighth of an inch. The bottom surface of each tooth 32 has material 36 thereon, such as a plurality of hooks or a plurality of loops thereon, which is commonly sold under the trademark VELCRO®. VELCRO® material is suitable and can be easily cleaned.

A support rib 34 is provided between each tooth 32 and the base rail 30 for strengthening the base rail 30 when the marking tool is pressed thereagainst. Each support rib 34 has the shape of a right triangle and has a length of one-eight of an inch.

Each end of the base rail 30 has a square sleeve 38, formed as a tube, provided thereon on the same side of the base rail 30 as the teeth 32. A square passageway 40 is provided through the sleeve 38 and extends in the same direction as the base rail 30. Each sleeve 38 extends from the end of the base rail 30 to the first support rib 34. Preferably, the sleeve 38 has a height of one half of a inch and a width of one half of an inch.

Each anchor 26 is made of a suitable material, such as metal, and has a first portion 42 and a second portion 44 which join together at a junction, with the second portion 44 being perpendicular to the first portion 42. The first portion 42 has a first section adjacent to the junction which has straight edges, a second section which has radiused edges, and a third section at the end of each anchor 26 which defines a curved edge and which connects the radiused edges of the second section together. The length of the first section is preferably two inches with the second and third sections decreasing in length to the end of each anchor 26; the width of the first portion 42 is preferably four inches; and the thickness of the first portion 42 is preferably one-thirty second of an inch. The upper surface of the first portion 42, that is the surface which is not facing the second portion 44, has material 46 thereon, such as a plurality of hooks or a plurality of loops thereon, which is commonly sold under the trademark VELCRO®. VELCRO® material is suitable and can be easily cleaned. The second portion 44 preferably has a width of four inches and a thickness of one-thirty second of an inch.

In use, the second portion 44 of each anchor 26 is inserted between at least two bricks 22 with the first portion 42 resting on top of one or more bricks 22. The anchors 26 are positioned such that when the tool 24 is attached thereto, the desired border or edge shape will be provided. The anchors 26 do not damage the bricks 22 in any way. The tool 24 is then mounted on the anchors 26 such that the material 36 on the bottom of the teeth 32 mates with the material 46 on the upper surface of one or more of the respective anchors 26. Sufficient numbers of anchors 26 are used to secure the tool 24 in place such that the tool 24 is firmly anchored to the bricks 22. Thereafter, a marking tool, such as a scribing tool, is pressed against the surface 28 of the base rail 30 and run along the length of the tool 24 to mark the bricks 22, such as by scribing. When the anchors 26 are mounted on the bricks 22, care is to be taken so that the anchors 26 will not fall along the desired edge or border line. That is, the installer does not want to run the marking tool over the anchors 26.

After the bricks 22 are marked, such as by scribing, the tool 24 is detached from the anchors 26 and the anchors 26 are removed from the bricks 22. The bricks 22 are then cut by suitable means to form the desired edge or border shape.

While the material 36, 46 for attaching the teeth 32 and the anchors 26 together is described as hook and loop material which is commonly sold under the trademark VELCRO®, it is to be understood that other means for attaching the teeth 32 and the anchors 26 together are within the scope of the invention. Also, if hook and loop material is used, it has been found that the hook material is preferably used on the teeth 32 and the loop material is preferably used on the anchors 26. In addition, the material 36 on the teeth 32 can span one or more teeth 32, if desired.

Figure 14:
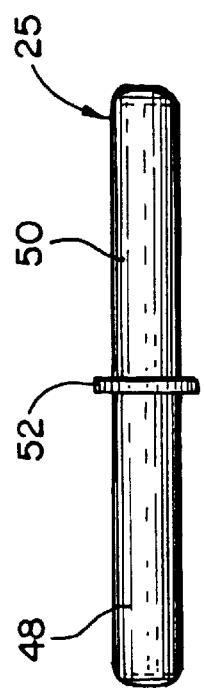
FIG. 14 is a side elevational view of a connecting member that is used to connect together two of the tools shown in FIGS. 1–5 or to connect together two of the tools shown in FIGS. 9 and 10.

If desired, two tools 24 can be attached together using the connecting member 25 shown in FIG. 14. The connecting member 25 is a one piece member formed of smooth metal or plastic. The connecting member 25 includes first and second cylindrical portions 48, 50 having a predetermined diameter, with an enlarged diameter portion 52 in the middle thereof. To connect two tools 24 together, the first portion 48 is inserted into the passageway 40 in the sleeve 38 of one of the tools 24 and the second portion 48 is inserted into the passageway 40 in the sleeve 38 of the other tool 24. The first portion 48 sits snugly within the sleeve 38 of the tool 24 by a friction fit and the second portion 50 sits snugly within the sleeve 38 of the other tool 24 by a friction fit. The middle portion 52 sits between the two tools 24 as its diameter is larger than the passageways 40. The ends of the end portions 48, 50 are rounded so that the connecting member 25 can be easily inserted into the tools 24.

Attention is now invited to the second embodiment of the template system 20a shown in FIGS. 9–14.

The tool 24a is formed from an elongated, square sleeve 54 having a bottom wall, opposite side walls extending upwardly from the bottom wall, and a top wall connected to the upper ends of the side walls. A square passageway 56 extends completely through the sleeve 54 along the length thereof. The sleeve 54 is formed of a suitable material, such as flexible, but rigid, plastic. The sleeve 54 preferably has a height of one half of an inch and a width of one half of an inch. The length of the sleeve 54 can vary depending on the application, but is preferably eight feet long.

The bottom surface of the sleeve 54 has material 58 thereon along the length thereof, such as a plurality of hooks or a plurality of loops thereon, which is commonly sold under the trademark VELCRO®. VELCRO® material is suitable and can be easily cleaned.

The sleeve 54 forms the surface 28a against which the marking tool is placed. The sleeve 54 is flexible such that the sleeve 54 can be moved into a variety of shapes.

Each anchor 26a is formed from a first portion 60, a second portion 62 and a third portion 64, each of which are integrally formed with each other. Each anchor 26a is made of a suitable material, such as metal.

An end of the first portion 60 and a first end of the second portion 62 join together at a junction, with the second portion 62 being perpendicular to the first portion 60. The first portion 60 has a first section adjacent to the junction which has straight edges and a second section which defines a curved edge. The first portion 60 is preferably four inches in length, has a width of one inch, and a thickness of one-sixteenth of an inch. The second portion 62 is preferably one inch in length, has a width of one inch and has a thickness of one-sixteenth of an inch. The upper end of the second portion 62 may be curved.

The third portion 64 has a first end joined with the second end of the second portion 62 and is parallel to the second portion 62. An upper section of the third portion 64 abuts against and overlaps the second portion 62, such that a lower section of the third portion 64 extends downwardly from the lower end of the second portion 62 and from the first portion 60. The first portion 60 is positioned at approximately the midpoint of the third portion 64. The lower section of third portion 64 has an arcuate bend 66 therein. The third portion 64 is preferably two inches in length, has a width of one inch and has a thickness of one-sixteenth of an inch. The upper end of the third portion 64 matches the upper end shape of the second portion 62.

The upper surface of the first portion 60, that is the surface which is not facing the lower section of the third portion 64, has material 68 thereon, such as a plurality of hooks or a plurality of loops thereon, which is commonly sold under the trademark VELCRO®. VELCRO® material is suitable and can be easily cleaned.

In use, the lower section of the third portion 64 of each anchor 26a is inserted between at least two bricks 22 with the first portion 60 resting on top of one or more bricks 22 and the second portion 62 and the upper section of the third portion 64 extending upwardly from the bricks 22. The second portion 62 and the upper section of the third portion 64 from a handle for an installer to easily insert and remove the anchor 26a from the bricks 22. The arcuate bend 66 abuts against the sides of the bricks 22 and acts as a spring to securely hold the anchor 26a between the bricks 22. The anchors 26a are positioned such that when the tool 24a is attached thereto, the desired border or edge shape will be provided. The anchors 26a do not damage the bricks 22 in any way. The tool 24a is then mounted on the anchors 26a such that the material 58 on the bottom of the sleeve 54 mates with the material 68 on the upper surface of one or more of the respective anchors 26a. Sufficient numbers of anchors 26a are used to secure the tool 24a in place such that the tool 24a is firmly anchored to the bricks 22. Thereafter, a marking tool, such as a scribing tool, is pressed against the surface 28a of the sleeve 54 and run along the length of the tool 24a to mark the bricks 22, such as by scribing. When the anchors 26a are mounted on the bricks 22, care is to be taken so that the anchors 26a will not fall along the desired edge or border line. That is, the installer does not want to run the marking tool over the anchors 26a.

After the bricks 22 are marked, such as by scribing, the tool 24a is detached from the anchors 26a and the anchors 26a are removed from the bricks 22 by the installer grasping the handle formed by the second portion 62 and the upper section of the third portion 64. The bricks 22 are then cut by suitable means to form the desired edge or border shape.

While the material 58, 68 for attaching the sleeve 54 and the anchors 26a together is described as hook and loop material which is commonly sold under the trademark VELCRO®, it is to be understood that other means for attaching the sleeve 54 and the anchors 26a together are within the scope of the invention. Also, if hook and loop material is used, it has been found that the hook material is preferably used on the sleeve 54 and the loop material is preferably used on the anchors 26a.

If desired, two tools 24a can be attached together using the connecting member 25 shown in FIG. 14. To connect two tools 24a together, the first portion 48 is inserted into an end of the passageway 56 in the sleeve 54 and the second portion 48 is inserted into an end of the passageway 56 in the other sleeve 54. The first portion 48 sits snugly within the one tool 24a by a friction fit and the second portion 50 sits snugly within the other tool 24a by a friction fit. The middle portion 52 sits between the two tools 24a as its diameter is larger than the passageways 56. The ends of the end portions 48, 50 are rounded so that the connecting member 25 can be easily inserted into the tools 24a.

The sleeve 54 can have a solid middle portion with passageways in the ends of the sleeve 54 for connecting two tools together.

Figure 6:
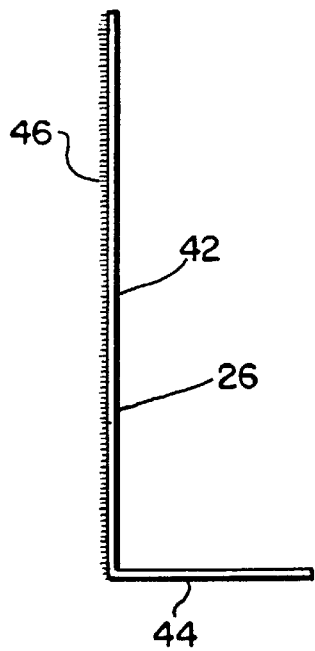
FIG. 6 is a side elevational view of a first embodiment of an anchor which forms another portion of the template system of the present invention.
Figure 7:
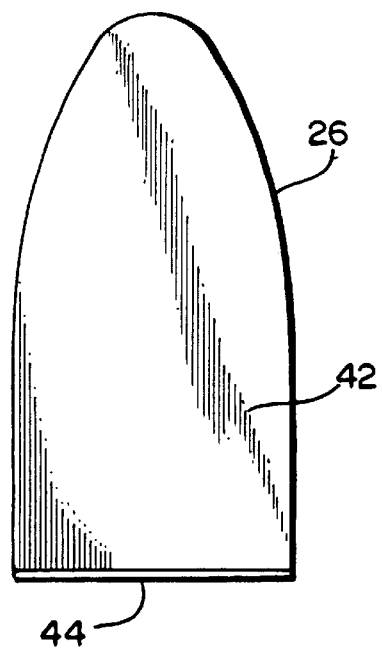
FIG. 7 is a bottom plan view of the anchor of FIG. 6.
Figure 8:
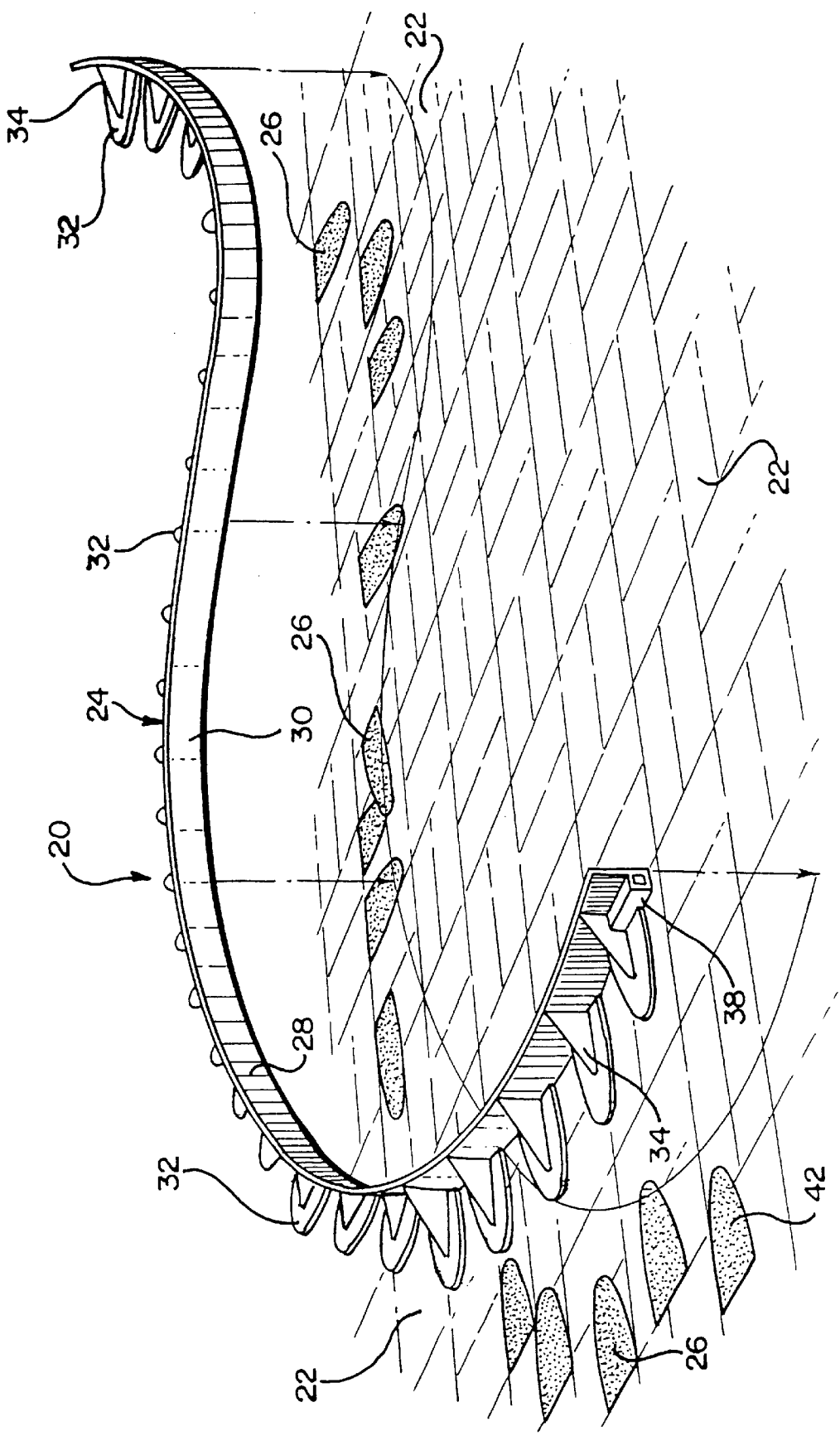
FIG. 8 is a perspective view of a plurality of the anchors shown in FIGS. 6 and 7 mounted onto a brick walkway, driveway or the like, and showing the tool of FIGS. 1–5, in perspective, as the tool is about to mounted onto the anchors.
Figure 9:
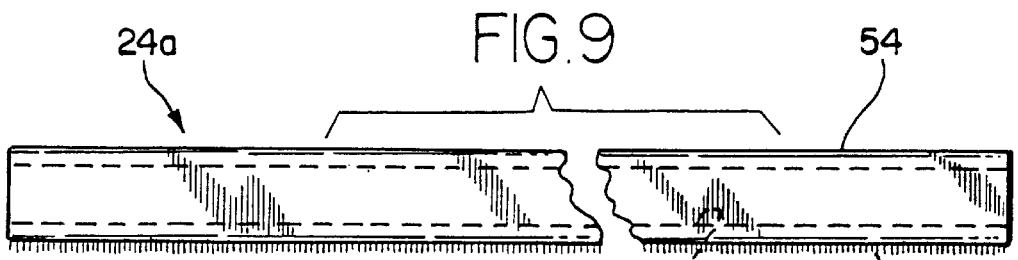
FIG. 9 is a partial side elevational view of a second embodiment of a tool which forms a portion of the template system of the present invention.
Figure 10:
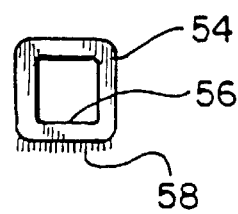
FIG. 10 is an end elevational view of the tool of FIG. 9.
Figure 11:
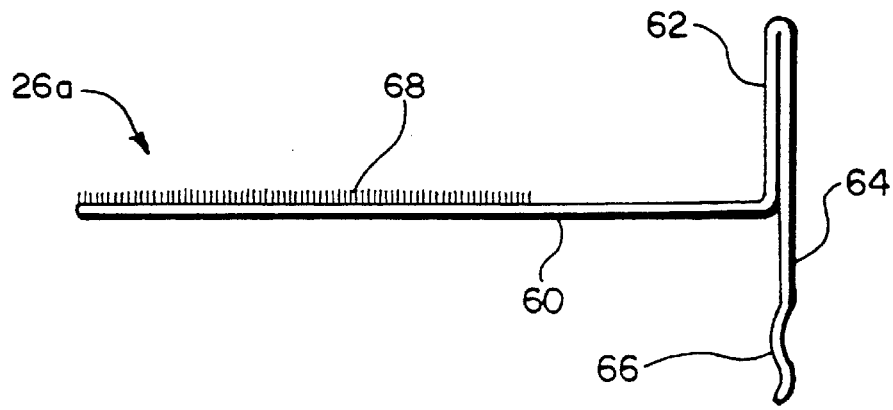
FIG. 11 is a side elevational view of a second embodiment of an anchor which forms another portion of the template system of the present invention.
Figure 12:
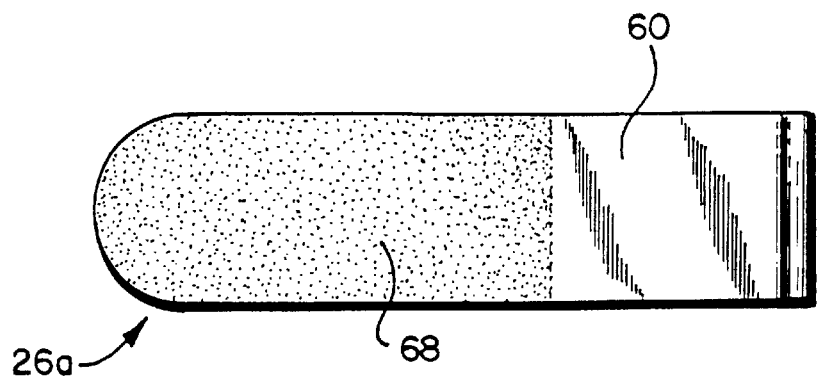
FIG. 12 is a top plan view of the anchor of FIG. 11.
Figure 13:
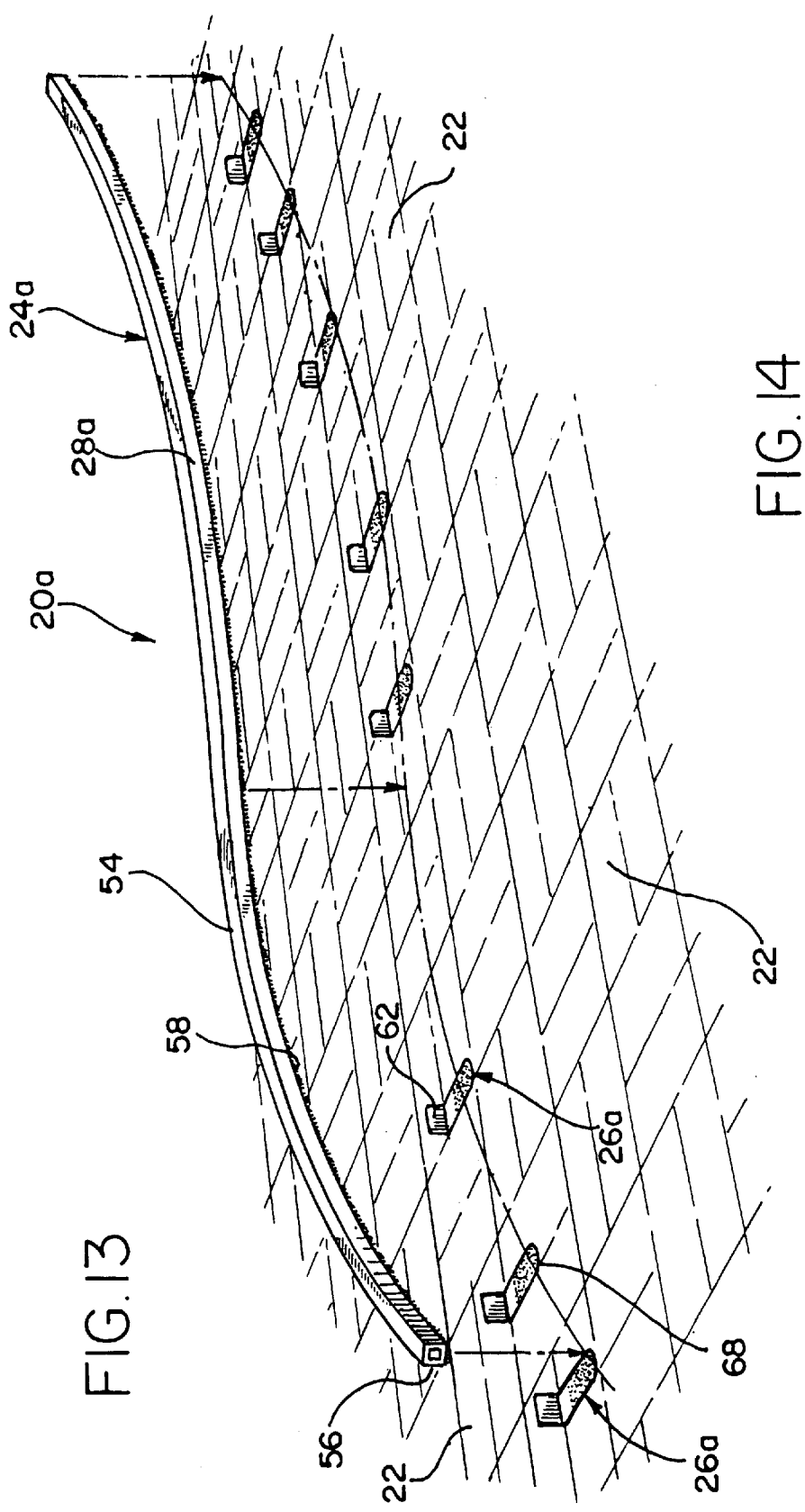
FIG. 13 is a perspective view of a plurality of the anchors shown in FIGS. 11 and 12 mounted onto a brick walkway, driveway or the like, and showing the tool of FIGS. 9 and 10, in perspective, as the tool is about to mounted onto the anchors.

In addition, the anchor 26 shown in FIGS. 6 and 7 can include an arcuate bend, like arcuate bend 66 in FIG. 11, in the second portion 44.

It is to be understood that marking tools other than scribing tools, such as a pencil or a soapstone, are within the scope of the invention.

While preferred embodiments of the present invention are shown and described, it is envisioned that those skilled in the art may devise various modifications of the present invention without departing from the spirit and scope of the appended claims.

The invention claimed is:

1. A template system which enables an installer to mark a plurality of concrete paving bricks already laid in a predetermined pattern comprising:

an elongated tool having a surface against which a marking member can be placed, said elongated tool being flexible such that said elongated tool can be moved into a variety of different shapes; and a plurality of anchors, each said anchor having a first portion and a second portion, said second portion being perpendicular to said first portion, said first portion having a horizontal planar surface capable of resting on top of at least one of said plurality of concrete paving bricks, said second portion having a vertical planar surface capable of being inserted between at least two of said plurality of concrete paving bricks and being removable from between said at least two of said plurality of concrete paving bricks, each said anchor being stabilized and rotationally immoblized when said second portion is positioned between said at least two of said plurality of concrete paving bricks, said elongated tool capable of being attached to said first portions of said plurality of anchors so that said tool is stabilized and is rotationally immobilized at each said anchor.

2. A template system as defined in claim 1, wherein said tool includes an elongated base rail which provides said surface against which a marking member can be placed, said base rail being flexible such that said base rail can be moved into a variety of shapes, and a plurality of teeth attached to said base rail, said teeth being spaced apart from each other along said base rail, each said tooth being capable of being attached to said first portion of at least one of said anchors.

3. A template system as defined in claim 2, wherein during use, only select ones of said teeth are attached to said first portions of said anchors.

4. A template system as defined in claim 2, wherein each said tooth is perpendicular to said base rail.

5. A template system as defined in claim 2, further including a support rib provided between each said tooth and said base rail.

6. A template system as defined in claim 2, wherein one of said teeth and said first portions of said anchors has a plurality of hooks thereon and wherein the other of said teeth and said first portions of said anchors has a plurality of loops thereon, said hooks and loops being capable of being engaged with each other to secure said elongated tool to said first portions of said anchors.

7. A template system as defined in claim 2, further including a passageway provided in at least one end of said base rail, and further including a connecting member, said connecting member being capable of being inserted into said passageway and into the passageway of another tool for joining two tools together.

8. A template system as defined in claim 1, wherein one of said elongated tool and said first portions of said anchors has a plurality of hooks thereon and wherein the other of said elongated tool and said first portions of said anchors has a plurality of loops thereon, said hooks and loops being capable of being engaged with each other to secure said elongated tool to said first portions of said anchors.

9. A template system as defined in claim 1, wherein said second portion of each said anchor has an arcuate bend therein.

10. A template system as defined in claim 1, wherein each said anchor further includes a third portion which extends perpendicularly to said first portion and is parallel with said second portion, said third portion extending from an opposite side of said first portion to which said second portion extends such that when said second portion is mounted between said at least two of said plurality of concrete paving bricks, said third portion extends upwardly from said at least two of said plurality of concrete paving bricks.

11. A template system as defined in claim 10, wherein said second portion of each said anchor has an arcuate bend therein.

12. A template system as defined in claim 1, wherein said tool includes an elongated sleeve having a passageway in at least one end of said sleeve, said sleeve providing said surface against which a marking member can be placed, said sleeve being flexible such that said sleeve can be moved into a variety of shapes.

13. A template system as defined in claim 12, wherein one of said sleeve and said first portions of said anchors has a plurality of hooks thereon and wherein the other of said sleeve and said first portions of said anchors has a plurality of loops thereon, said hooks and loops being capable of being engaged with each other to secure said elongated tool to said first portions of said anchors.

14. A template system as defined in claim 12, further including a connecting member, said connecting member being capable of being inserted into said passageway and into the passageway of another tool for joining two tools together.

15. A template system which enables an installer to mark a plurality of concrete paving bricks already laid in a predetermined pattern comprising:
   a tool including an elongated base rail which provides a surface against which a marking member can be placed, said elongated base rail being flexible such that said elongated base rail can be moved into a variety of different shapes, a plurality of teeth attached to said elongated base rail, said teeth being spaced apart from each other along said elongated base rail and being perpendicular to said elongated base rail, and a support rib provided between each said tooth and said elongated base rail; and
   a plurality of anchors, each said anchor having a first portion and a second portion, said second portion being perpendicular to said first portion, said first portion having a horizontal planar surface capable of resting on top of at least one of said plurality of concrete paving bricks, said second portion having a vertical planar surface capable of being inserted between at least two of said plurality of concrete paving bricks and being removable from between said at least two of said plurality of concrete paving bricks, each said anchor being stabilized and rotationally immoblized when said second portion is positioned between said at least two of said plurality of concrete paving bricks,
      one of said teeth and said first portions of said anchors having a plurality of hooks thereon and wherein the other of said teeth and said first portions of said anchors having a plurality of loops thereon, each said tooth being capable of being attached to at least one of said first portions of said anchors by engagement of said hooks and loops so that said tool is stabilized and is rotationally immobilized at each said anchor.

16. A template system as defined in claim 15, wherein each said second portion of each said anchor includes an arcuate bend therein.

17. A template system as defined in claim 15, wherein each said anchor further includes a third portion which extends perpendicularly to said first portion and is parallel with said second portion, said third portion extending from an opposite side of said first portion to which said second portion extends such that when said second portion is mounted between said at least two of said plurality of concrete paving bricks, said third portion extends upwardly from said at least two of said plurality of concrete paving bricks.

18. A template system which enables an installer to mark a plurality of concrete paving bricks already laid in a predetermined pattern comprising:
   a tool including an elongated sleeve which provides a surface against which a marking member can be placed, said elongated sleeve being flexible such that said elongated sleeve can be moved into a variety of different shapes; and
   a plurality of anchors, each said anchor having a first portion and a second portion, said second portion being perpendicular to said first portion, said first portion having a horizontal planar surface capable of resting on top of at least one of said plurality of concrete paving bricks, said second portion having a vertical planar surface capable of being inserted between at least two of said plurality of concrete paving bricks and being removable from between said at least two of said plurality of concrete paving bricks, each said anchor being stabilized and rotationally immoblized when said second portion is positioned between said at least two of said plurality of concrete paving bricks,
      one of said sleeve and said first portions of said anchors having a plurality of hooks thereon and wherein the other of said sleeve and said first portions of said anchors having a plurality of loops thereon, said sleeve being capable of being attached to at least one of said first portions of said anchors by engagement of said hooks and loops so that said tool is stabilized and is rotationally immobilized at each said anchor.

19. A template system as defined in claim 18, wherein each said second portion of each said anchor includes an arcuate bend therein.

20. A template system as defined in claim 18, wherein each said anchor further includes a third portion which extends perpendicularly to said first portion and is parallel with said second portion, said third portion extending from an opposite side of said first portion to which said second portion extends such that when said second portion is mounted between said at least two of said plurality of concrete paving bricks, said third portion extends upwardly from said at least two of said plurality of concrete paving bricks.

* * * * *